US006763517B2

(12) United States Patent
Hines

(10) Patent No.: US 6,763,517 B2
(45) Date of Patent: Jul. 13, 2004

(54) AUTOMATED ANALYSIS OF KERNEL AND USER CORE FILES INCLUDING SEARCHING, RANKING, AND RECOMMENDING PATCH FILES

(75) Inventor: George W. Hines, Campbell, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 630 days.

(21) Appl. No.: 09/781,832

(22) Filed: Feb. 12, 2001

(65) Prior Publication Data

US 2002/0112200 A1 Aug. 15, 2002

(51) Int. Cl.$^7$ ................................................. G06F 9/44
(52) U.S. Cl. ........................ 717/124; 717/168; 717/126; 717/128; 717/127; 714/48; 714/49; 714/53
(58) Field of Search ................................. 717/124, 106, 717/168, 170, 173; 714/37, 38, 45; 700/81; 710/2; 713/1; 711/102

(56) References Cited

U.S. PATENT DOCUMENTS

| | | | |
|---|---|---|---|
| 4,517,639 A | * 5/1985 | Ferrell et al. | 700/81 |
| 5,111,384 A | 5/1992 | Aslanian et al. | 395/575 |
| 5,157,667 A | * 10/1992 | Carusone et al. | 714/45 |
| 5,335,341 A | 8/1994 | Chana | 395/575 |
| 5,412,802 A | 5/1995 | Fujinami et al. | 395/575 |
| 5,481,713 A | * 1/1996 | Wetmore et al. | 717/170 |
| 5,537,539 A | * 7/1996 | Narihiro | 714/38 |
| 5,790,777 A | 8/1998 | Izuta et al. | 395/183.21 |
| 5,790,856 A | * 8/1998 | Lillich | 717/163 |
| 5,802,549 A | * 9/1998 | Goyal et al. | 711/102 |
| 5,819,024 A | 10/1998 | Kasuga et al. | 395/183.02 |
| 5,983,000 A | 11/1999 | Perron | 395/182.06 |
| 5,999,933 A | 12/1999 | Mehta | 707/100 |
| 6,012,152 A | * 1/2000 | Douik et al. | 714/26 |
| 6,052,531 A | * 4/2000 | Waldin et al. | 717/170 |
| 6,243,766 B1 | * 6/2001 | Sliger et al. | 710/2 |
| 6,317,880 B1 | * 11/2001 | Chamberlain et al. | 717/174 |

(List continued on next page.)

FOREIGN PATENT DOCUMENTS

| | | | | |
|---|---|---|---|---|
| JP | 363311434 A | * 12/1988 | | G06F/9/06 |
| JP | 408297598 A | * 11/1996 | | G06F/11/34 |
| JP | 02000250743 A | * 9/2000 | | G06F/9/06 |

OTHER PUBLICATIONS

Jacobs, Web eases software patches and updates, Oct. 21, 1996, Computerworld, vol. 33, Issue 43, p. 79.*
Michael Hics, Dynamic Software Updating, 2001, ACM Press, New York, pp. 13–23.*
Dawson Engler, Bugs as Deviant Behavior: A General Approach to Inferring Errors in Systems Code, 2001, ACM Press, New York, pp. 57–72.*
Robert Wahbe, Efficient Software—Based Fault Isolation, 1994, ACM Press, New York, pp. 203–216.*

Primary Examiner—Ohameli C. Das
Assistant Examiner—Satish Rampuria
(74) Attorney, Agent, or Firm—Kent A. Lembke; William J. Kubida; Hogan & Hartson LLP

(57) ABSTRACT

A computerized method for automatically analyzing a core file created by a computer system after an unexpected interrupt. The packages installed on the computer system are determined and patch files of descriptive data for previously identified patches are accessed to create a patch search set including patches configured for use with the installed packages. Patches in the patch search set are scored by assigning points to each patch based on scoring rules, e.g., searching the patch descriptive data for matches between portions of the patch descriptive data and portions of the core file, including bug descriptions. For UNIX™-based kernel core files, the scoring rules involve creating search criteria based on panic types and on panic metric data gathered from the core file. A detailed patch search report is created providing recommendations for each of the scored patches based on the assigned score and identifying patches for installation.

25 Claims, 4 Drawing Sheets

U.S. PATENT DOCUMENTS

| | | | |
|---|---|---|---|
| 6,363,524 B1 * | 3/2002 | Loy .......................... | 717/170 |
| 6,434,744 B1 * | 8/2002 | Chamberlain et al. ...... | 717/168 |
| 6,438,664 B1 * | 8/2002 | McGrath et al. ............ | 711/154 |
| 6,477,703 B1 * | 11/2002 | Smith et al. ................ | 717/168 |
| 6,490,695 B1 * | 12/2002 | Zagorski et al. .............. | 714/38 |
| 6,493,871 B1 * | 12/2002 | McGuire et al. ............ | 717/173 |
| 6,496,974 B1 * | 12/2002 | Sliger et al. ................ | 717/106 |
| 6,553,507 B1 * | 4/2003 | Cohen .......................... | 714/4 |
| 6,643,802 B1 * | 11/2003 | Frost et al. .................. | 714/37 |
| 2001/0011358 A1 * | 8/2001 | Ochiai ........................ | 714/45 |
| 2002/0073304 A1 * | 6/2002 | Marsh et al. .................. | 713/1 |

\* cited by examiner

| 212 | 214 | 216 | 218 |
|---|---|---|---|
| BUG ID | BUG SYMPTOMS | BUG SYNOPSIS | BUG DESCRIPTION |
| 4176939 | CRASH, HANG | OPEN CALL HANGS ON NFS MOUNT POINT WITH STALE FILE HANDLE | FREE-FORM TEXT ENTERED BY DEVELOPER DESCRIBING THE PROBLEM |
| 4176940 | TRAP/DATA FAULT PANIC | PANICS WHEN OBJECT 1( ) IS CALLED WITH PID OF A PROCESS | FREE-FORM TEXT ENTERED BY DEVELOPER DESCRIBING THE PROBLEM |

| 222 | 224 | 226 |
|---|---|---|
| PATCH ID & VERSION # | RELATED PACKAGES | ARCHITECTURE AND VERSION OF PACKAGES |
| 106637 /37 | OS3.1; COMPILER C++ | i386/ .31 |

| 232 | 234 | 236 |
|---|---|---|
| PATCH ID & VERSION # | PATCH DESCRIPTION | REFERENCED BUGS |
| 106637 /37 | FIXES FOR HANDLING MULTICAST ADDRESSES | 4176939; 4176940 |

AUTOMATED ANALYSIS OF KERNEL AND USER CORE FILES INCLUDING SEARCHING, RANKING, AND RECOMMENDING PATCH FILES

BACKGROUND OF THE INVENTION

1. Field of the Invention

The present invention relates, in general, to systems and methods for analyzing core files and correcting and/or addressing bugs or errors in software applications executing on a computer system, and, more particularly, to an automated system and method for processing kernel and user core files created upon occurrence of an unexpected exception and for searching bug and patch records to rank the available patches and to recommend corrective actions that may be taken to enhance operation of the computer system.

2. Relevant Background

Computer system designers and analysts face the ongoing and often difficult task of determining how to fix or improve operation of a computer system that has experienced an unexpected exception or is failing to operate as designed (e.g., is experiencing errors caused by software problems or "bugs"). When a problem or bug in the computer system software is serious enough to stop or interrupt the execution of a running program, this failure is known as a crash. To assist in identifying bugs in the software operating on a computer system, software applications are often configured to create a crash dump or memory dump when an unexpected exception occurs to generate a memory image of the existing state of software executing on the system at the time of the crash or exception. These memory images are sometimes called core files (or dump files).

The system-level commands or programs in the operating system, i.e., the kernel software, are of particular interest to system analysts in correcting bugs in a crashed computer system. For example, in an UNIX®-based system, the kernel is the program that contains the device drivers, the memory management routines, the scheduler, and system calls. Often, fixing bugs begins with analysis of these executables, which have their state stored in a kernel core file. Similarly, user programs or binaries (e.g., binary, machine readable forms of programs that have been compiled or assembled) can have their state stored in user core files for later use in identifying the bugs causing the user applications to crash or run ineffectively.

Instead of writing a new, complete replacement version of the software (that crashed or had bugs), the designer or developer often prepares one or more small additions or fixes to the original software code (i.e., patches) written to correct specific bugs. For example, when a specific bug is identified, a patch is written or obtained from a third party to correct the specific problem and the patch is installed on the computer system. A single patch often contains fixes for many bugs for convenience. However, a particular bug is usually, but not always, fixed by a single patch (i.e., multiple patches usually do not address the same bugs). Typically, system analysts or operators keep or acquire records of previously identified bugs and corresponding patches installed for each identified bug. Then, when a bug is encountered in a system, the system analyst efforts to fix the problem begin with a search of these records of prior bugs to identify the bug or find a similar, previously-identified bug. Once the bug is identified, a relevant patch is selected that may correct the problem or a new patch may be written similar to or based on the previous patch. Additionally, the analyst may determine if a newer version of the patch is now available.

For example, a bug may be identified that causes an exception, such as causing the computer system to fall into panic when two specific programs are run concurrently. A record of the bug would then be created and stored in a database including a bug identifier (e.g., alpha-numeric identification code) along with descriptive information such as a synopsis describing the problem (for the above example, "system falls into panic while shutdown procedure is executed during writing") and information describing the results or symptoms of the bug (e.g., a crash, hang, stack trace, type of panic, and the like). Once a fix for the bug is available, a patch may be created containing the bug fix and other bug fixes. A patch record is associated with each patch. The patch record includes identifying information such as a patch identifier (e.g., an alpha-numeric code), references to corrected or addressed bugs, textual description of the purposes of the patch, references to specific software useful with the patch (e.g., a specific user application, kernel software for specific operating systems, and the like), dependent packages, related patches, and other useful identifying and patch-user information.

While providing useful information to a system analyst, the volume of information in these bug and patch files usually grows into a very large, unmanageable amount of information (e.g., 500,000 and more bug entries for widely-used operating computer systems and networks), and the amount of data in these files continues to grow as new bugs and patches are identified, created, and installed. Hence, the task of identifying appropriate patches for an identified bug is a difficult task, and system analysts often resort to making educated guesses for searching these lengthy patch records.

Existing searching methods for identifying appropriate patches to correct bugs do not meet the needs of system analysts. Searching methods and tools are typically fully or partially manual processes involving manually entering search terms to process the large patch record lists, identifying potentially relevant patches, and then selecting one or more patches.

In addition, the more direct approach of analyzing the resulting core file to accurately identify the bug causing the problem is an even more difficult task. The core file analysis tools available are typically only useful for kernel core files and are difficult to effectively use (e.g., require extensive training and knowledge of the system being analyzed which often can only be gained with years of working experience).

Often, the operator is unable to identify a specific patch for the problem and is forced to install numerous patches to increase the likelihood that the bug will be corrected. This inaccurate "over" patching is often time consuming, costly, and disruptive to the computer system, which may not be acceptable to users of the system. Some patch tools are available to identify patches that are installed on the computer system for which new versions are available (which in many systems is hundreds of patches at any given time), but these tools do not assist in identifying a particular patch for correcting an identified bug.

Hence, there remains a need for an improved method and system for identifying patches for installation in a computer system to correct or address software bugs or glitches. Such a method and system preferably would leverage existing tools and files (e.g., bug and patch files) and be configured to be easy to use with little or no operator training while still providing an accurate identification of appropriate patches to correct bugs identifiable in a core file (such as a kernel core file and, also, a user core file).

SUMMARY OF THE INVENTION

The present invention addresses the above discussed and additional problems by providing an automated core analysis system including a core analysis tool to allow a user, such as a system analyst, to quickly process a core file and search through available patches to identify one or more patches that address the problems (i.e., bugs) found in the core file. Significantly, the analysis of the core dump or core file is performed automatically by the core analysis tool, thereby reducing the need for special training and system knowledge. Patch searching is also performed automatically and in one embodiment, is more effective because it includes an initial step of creating a patch search set based on the software packages actually installed on the client computer system that generated the core file. The patch search set may be further narrowed based on the identified problem type. The patches in the patch search set are then ranked or scored by the core analysis tool based on a patch scoring system (e.g., based on matches between patch and bug descriptions and a crashed program and/or based on panic metrics or other search criteria). The scoring of the patches is then utilized (along with other relevant patch and bug information) to create a detailed patch search report or patch list that includes recommended courses of action for correcting the bugs in the client computer system (such as to install one or more identified and highly ranked patches).

More particularly, a method is provided for analyzing a core file created by or for a computer system. The core file is generally a memory image including information on programs executing on the computer system at the time of an unexpected interrupt. The core analysis method includes determining the packages installed on the computer system to narrow the field of patches that are processed during the analysis method. The set of packages is narrowed based on the type of problem identified. Next, patch files comprising descriptive data for previously identified patches are accessed and a patch search set is created that includes the patches in the patch file that are configured for use with the reduced set of packages. Each patch in the patch search set is then scored by assigning a number of points to each patch based on a predefined set of scoring rules. A patch search report is then created providing details on the scoring of all relevant patches, such as identifying which bug and patch matched specific search criteria. Update recommendations may also be included in this report by including a step for determining which patches have been previously installed on the computer system and identifying if newer versions of the installed patches are available.

According to a unique feature of the invention, the core analysis method is useful for providing a patch search report for user core files and for kernel core files. When the core file is a user core file, the method includes identifying matches between the descriptive data for the patches in the patch search set and program descriptive information in the core file. Additionally, cumulative scoring is provided for bugs referenced by the patch and program descriptive information in the core file. When the core file is a kernel core file, the method includes identifying a type of fault, gathering fault metrics, and creating a search criteria based on the identified type of fault and the gathered fault metrics. In a UNIX™-based application of the method, the fault type is a panic type and the fault metrics are panic strings, a number of pre-panic functions, and/or a number of pre-panic modules. Matches with each bug in the patch search set are determined for each of the fault metrics in the search criteria and a number of points are awarded or added to the relevant patch score. According to one embodiment of the method, the type of panic or fault is used as part of the method to adapt or modify the method by selecting which ones of the fault metric matches to award points. For example, it may be useful in identifying patches for installation to not award points for certain matches if the fault type indicates this match may be less relevant to correcting the actual problem in the computer system.

BRIEF DESCRIPTION OF THE DRAWINGS

FIG. 2 illustrates FIGS. 2A–2D illustrate exemplary data files that can be used on the computer system of FIG. 1.

DETAILED DESCRIPTION OF THE PREFERRED EMBODIMENTS

Figure 1:
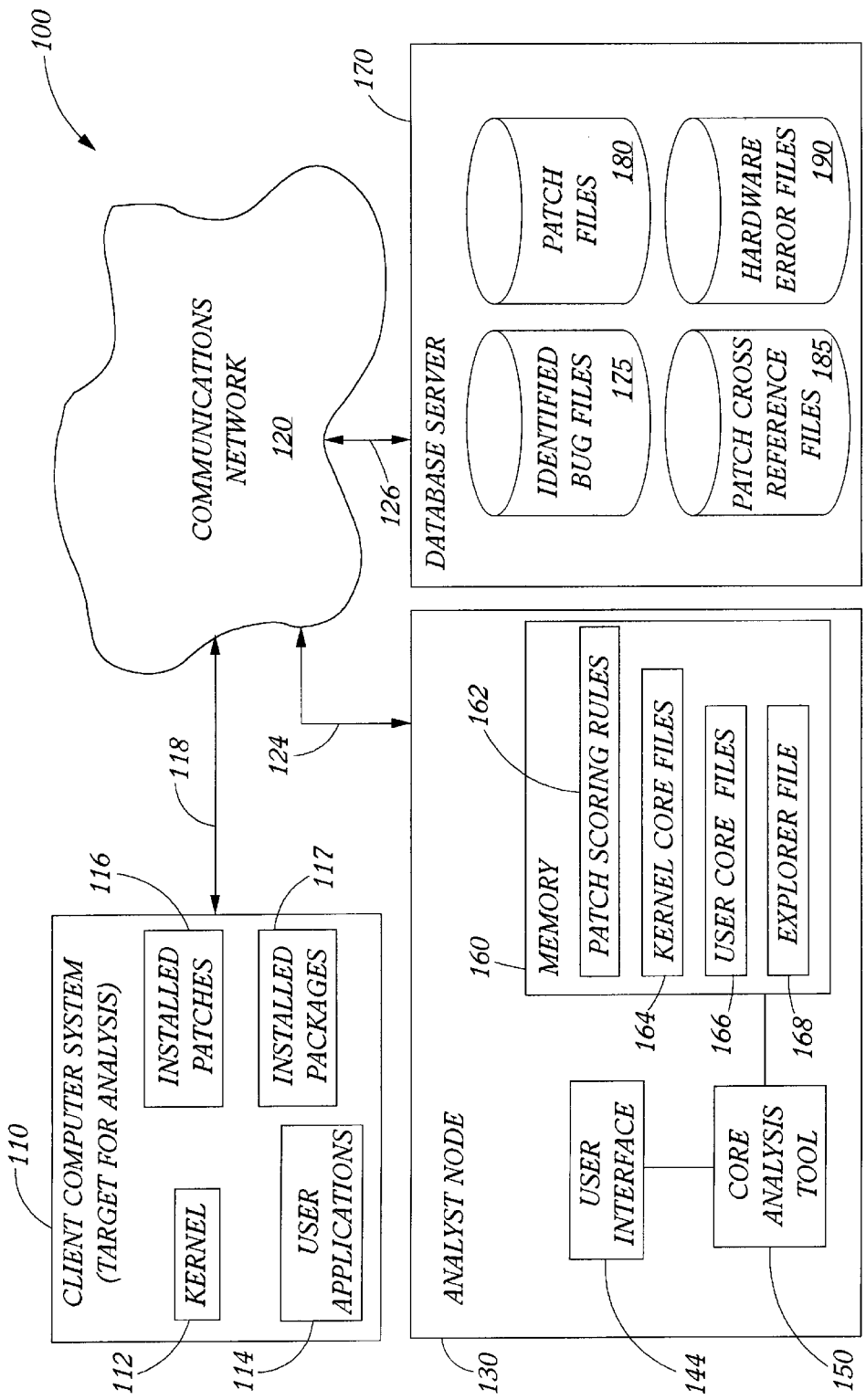
FIG. 1 is a block diagram illustrating an automated core analysis system with a patch selection system for analyzing kernel and user core files and identifying patches to address bugs in a client computer system according to the present invention.

FIG. 1 illustrates a client/server embodiment of an automated core analysis system 100 configured to provide the automated core or dump file analysis and patch searching, ranking, and recommending features of the present invention. The client/server implementation of the invention is intended as an exemplary embodiment, not as a limitation, as the inventive features of the core analysis system 100 may be implemented in less complex computer systems as well as more complex systems that would be apparent to those skilled in the computer arts when provided with the following description.

As illustrated, the analysis system 100 includes a client computer system 110 which may be any well-known type of computer system adapted for executing software programs, such as one or more servers and memory devices executing user software and an operating system. The client computer system 110 is a computer system that is a monitored or targeted system for debugging and system analysis when a crash or less serious operating problem occurs. As illustrated, the client computer system 110 is executing both kernel software 112, user applications 114, and installed packages 117. Additionally, one or more patches 116 have previously been installed on the client computer system 110.

In a preferred embodiment, the client computer system 110 is adapted for creating a memory image (i.e., a core file) providing byte sequence-type state information for the executing kernel software and/or user applications (such as at the time of a system crash). The core file typically also includes information that indicates the program that was executing at the time of the unexpected interrupt, provides a description of the program, and describes or otherwise indicates the type of interrupt (e.g., the type of panic) within fault or panic messages. For example, a kernel core file and, at least in some embodiments, a user core file is created at a selected time, such as upon a crash or an unexpected interrupt, and these core files are analyzed within the analysis system 100 to identify existing bugs and recommend patches.

To this end, the client computer system 110 typically would include processing mechanisms (such as a CPU) for performing logic, computational, and decision-making functions, memory devices, and an operating system (e.g., Solaris™, MS-DOS™, UNIX™, PICK™, or other OS) to manage the operation of the computer system 110. The particular processing mechanisms, memory arrangements, and operating systems are not critical or limiting elements of the system 100. The system 100 is useful with a wide variety of client computer system 110 configurations and modifications of the system 100 to suit particular configurations would be understood by those skilled in the computer arts. Typically, the kernel 112 or kernel software operates within the operating system and comprises the system-level commands (i.e., executables or executable files), such as device drivers, memory management routines, the scheduler, system calls, and the like. Analysis of the kernel 112 is typically an important part of performing a dump or core file analysis.

As illustrated, the client computer system 110 is in communication with an analyst node 130 that functions, at least in part, as a patch selection system or mechanism via communications links 118 and 124 and communications network 120. In turn, the analyst node 130 is in communication with a database server 170 via communications link 126 and network 120. The communications network 120 may be the Internet, an Intranet, or other useful data communications network with the links 118, 126 being digital data communications links (wired or wireless) selected to accommodate data transfer over and between the network 120, computer system 110, the analyst node 130, and the database server 170. In one embodiment, the client computer system 110 and analyst node 130 are components of a wide area network (WAN) but, as will be understood by those skilled in the computer arts, the invention is useful for other network arrangements and for non-networked devices (not shown). In a further embodiment, the core analysis features of the analyst node 130 are included as elements of the client computer system 110.

As illustrated, the analyst node 130 is able to receive data (such as core files and analysis requests) from the client computer system 110 and to retrieve information from the client computer system 110 (such as determining the installed software packages to narrow patch searching and gathering information on the installed patches 116 and installed packages 117). Of course, this information can be transferred in other non-network methods, such as transfer of a CD-ROM or other data storage device, which are considered within the breadth of this disclosure.

According to a significant feature of the invention, the analysis system 100 includes patch selection functionality with the analyst node 130 for automatically analyzing a kernel, user, or other core file and producing a patch list ranking relevant patches and providing other analysis information. In this regard, the analyst node 130 is connected via communications link 124 to the communications network 120 and client computer system 110 and database server 170. Typically, when the client computer system 110 experiences an unexpected interrupt (such as a system hang or crash), the system 110 via its operating system (not shown) or otherwise operates to create a kernel core file and/or a user core file that describe the existing state of these executables or programs. These core files are then transmitted with an analysis request (or the system 110 may be monitored on an ongoing or semi-continuous basis by the analyst node 130) over communications links 118, 124 and network 120 to the analyst node 130. The analyst node 130 includes memory 160 to store the kernel core files 164 and the user core files 166 (of course, these files 164, 166 and other information used by the core analysis system 100 may be stored in numerous locations within the system 100 as long as the information in the files is accessible by the analyst node 130).

As will be explained in more detail, the analyst node 130 in some embodiments is operable in an online mode in which communications are open between the analyst node 130 and the client computer system 110. Alternatively, the online mode may readily be achieved by having the analyst node 130 and the client computer system 110 combined within the same computer or computer system (not shown). In this mode, the analyst node 130 is operable to retrieve information from the client computer system 110 during core analysis. An important part of this information is a listing or identification of the packages or programs 117 operating on the client computer system 110, which are useful for narrowing the patch search (i.e., creating a smaller patch search set). In the online mode, it is also useful to retrieve information on the installed patches 116 that indicates which patches (including version) are already installed. This information is used by the analyst node 130 to determine if newer versions are available (e.g., the client computer system 110 is "down revision") that may better resolve operating problems in the client computer system 110.

In another operating mode, the analyst node 130 operates offline to gather information from core dump and a tool which gathers supplemental files (e.g., a program, such as Explorer™, that operates to create a file containing installed packages and their revisions and information on installed packages) for the client computer system 110 which is placed in the Explorer file 168. The data in the Explorer file 168 is then used to provide "context" from system 110 to be used by the analyst node 130 during core analysis. In the "offline" mode, sufficient supplemental information is or has been gathered from system 110 (including, for example, core dumps and key operating system files) to facilitate analyst node 130 in performing core analysis independently from system 110. Explorer™ is one of many tools that is useful for gathering the key operating system files, which include the list of installed packages 117, the list of installed patches 116, mapping of installed binaries to packages (e.g., the "contents" file on Solaris™). In some cases, all of these supplemental files may not be available, and in these cases, it is useful for the analyst node 130 to be adapted to use techniques to estimate portions of the data in these files. This estimation process can be used, for example, to create an upper bound on the list of kernel packages.

The analyst node 130 may be a computer system similar to computer system 110 (or be within the system 110). For example, the analyst node 130 may include one or more servers with executing software or objects, input/output devices, data storage devices, and one or more user terminals (e.g., desktop computers, notebook computers, and the like with modems, I/O ports, keyboards, and displays). As illustrated in FIG. 1, the analyst node 130 includes a user terminal with a user interface 144 for interfacing with a core analysis tool 150 and the client computer system 110. An operator, e.g., a system analyst, operates the user interface 144 to provide, select, and/or modify search criteria (in some embodiments) and to view and/or manipulate the detailed patch search report produced by the core analysis tool 150. In some operating modes of the system 100, the analyst node 130 may also be operable for directing the core analysis tool 150 to a location at which to retrieve dump and client computer system 110 information (e.g., by providing directories, paths, and the like).

According to an important feature of the invention, the analyst node 130 includes a core analysis tool 150 to provide automated analysis of the kernel core files 164 and the user core files 166 and to produce a patch listing or search report. The core analysis tool 150 comprises a software application(s) executing within the analyst node 130, and its operations are discussed fully with reference to FIG. 3. Briefly, during operation of the system 100, the core analysis tool 150 functions to communicate with the memory 160 to retrieve and analyze the kernel core files 164 and the user core files 166 (as applicable). The core analysis tool 150 is configured to retrieve installed packages 117 (or at least listings of such packages), installed patches 116, and other relevant information from the client computer system 110 and/or to receive analysis information from the analyst via the user interface 144.

An important function of the core analysis tool 150 is searching for applicable or relevant patches for correcting any identified bugs or problems in the client computer system 110. To this end, the core analysis system 100 includes the database server 170 that communicatively linked to the analyst node 130 for use by core analysis tool 150. The database server 170 includes: identified bug files 175 comprising a text description and synopsis for each previously identified bug; patch files 180 comprising information on currently available patches and the bugs addressed therein; patch cross reference files 185 comprising information related to mapping each patch to a package, package versions, operating system architectures, and latest versions of each patch; and hardware error files 190 comprising for each unique hardware error message (by architecture, platform, operating system, and patch) a description of problems and recommended actions (e.g., swap out the hardware part).

Figure 2D:
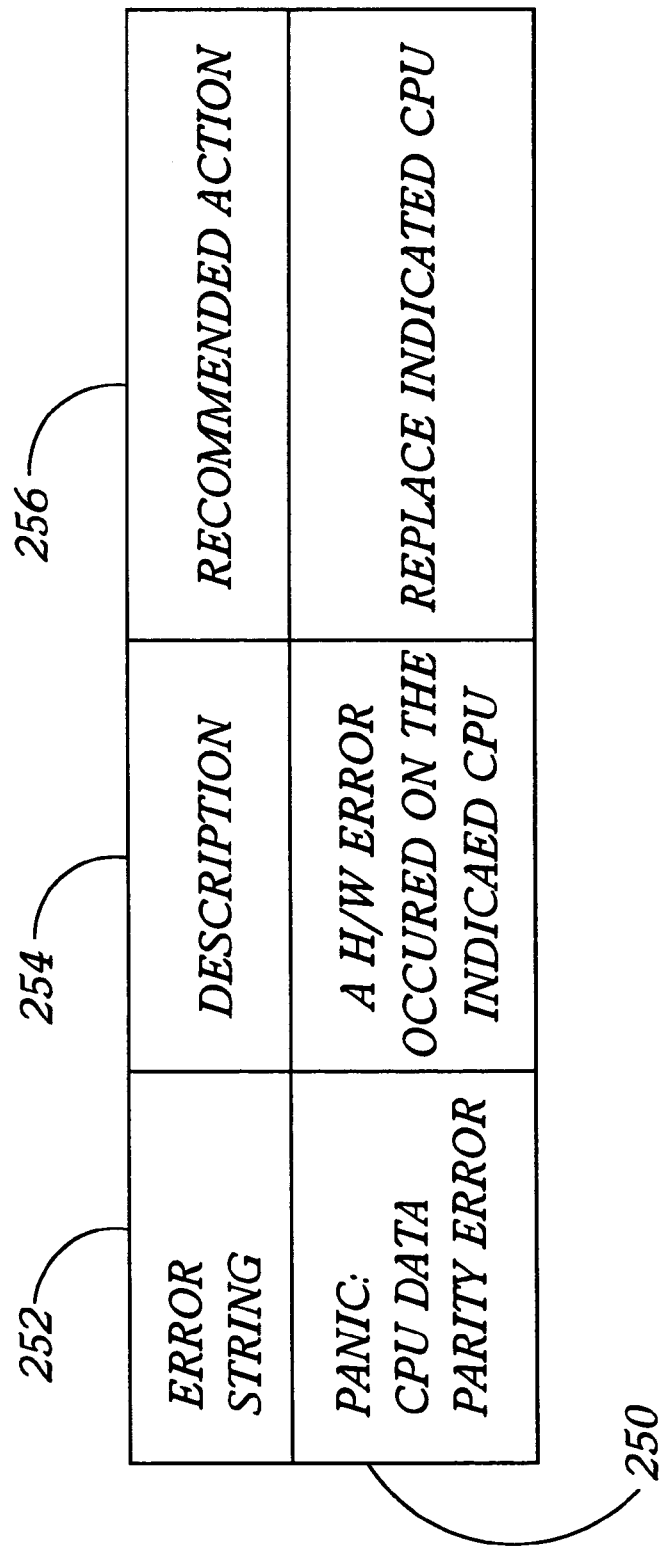

In one embodiment, the files 175, 180, 185, and 190 are database files and an exemplary (but not limiting) database configuration with at least one entry is shown in FIGS. 2A–2D. One embodiment of a database-type record 210 is shown in FIG. 2A for two exemplary identified bugs. As shown, each database entry includes a bug ID field 212 containing an identification code for the bug, a bug symptom field 214 for providing information on what type of interrupt may be caused by the bug (e.g., a panic type), a bug synopsis field 216 for inclusion of descriptive information on when or why the bug occurs and other data, and a bug description field 218 containing free-form text describing the problem (e.g., text entered by the analyst or others who identify the problem). While data for the bug symptoms field 214 can be stored in advance, in case it is not stored, a preferred configuration of the core analysis tool 150 calls for the derivation of this information at run time from the bug description field 218 information matched with the information from the core dump (files 164, 166, and 168 as applicable).

As shown in FIG. 2B, the patch cross reference file 220 (e.g., an exemplary file of patch cross reference files 185) is configured to include a patch ID and version field 222, a related package field 224, and an architecture and version of packages field 226. Of course, other useful fields may be utilized to store information pertaining to a patch for use in patch searching and scoring. The patch ID field 222 provides an alphanumeric code identifying the patch and the latest version. The field 226 provides the associated version and architecture type of the package named in field 224. The related packages field 224 provides information on which packages (such as operating systems, user applications, and the like) the particular patch is used with. Additionally, dependent package information (e.g., identifying related packages) may be extracted from the package information, i.e., obtained separately. As will be described in detail, the core analysis tool 150 may be configured to initially limit the number of patches searched by identifying the packages installed on the client computer system 110. The list of packages may then be further limited to those packages directly relevant to the problem and dependent packages. A patch search set of all the patches in the patch files 180 that relate to the reduced set of packages can then be effectively produced by the core analysis tool 150.

The database server 170 also includes patch files 180 and hardware error files 190. Referring to FIG. 2C, an exemplary patch file 230 is illustrated and is indexed by a patch ID and version field 232 as is the patch database file 220. The file 230 includes a patch description field 234 containing a text description of the patch and a bug reference field 236 containing a list of the bugs fixed by this patch.

As shown in FIG. 2D, file 250 is an exemplary hardware error database file from files 190. File 250 includes for each unique, identified hardware error message (by architecture, platform, and operating system) a description of the problem and recommended action. In this regard, although not shown, each file 250 typically includes an H/W error message field, a problem description field, a recommended action field, and other useful fields. As shown, the file 250 includes an error string field 252, a description field 254, and a recommended action field 256.

A scoring process carried out by the core analysis tool 150 ranks the patches in the patch search set. The patch rankings and scores are used in producing a detailed patch search report with scoring of each patch and with patch installation or other corrective recommendations or actions. The scoring process for analyzing kernel core files 164 uses information in patch description field 234 looking for textual matches (such as matches between the descriptive information in the field 234 for a patch and the relevant modules in the kernel core dump) and scoring the patch based on matches. Similarly, in analyzing user core files, the information in this field 234 is used to match with relevant information relating to the program that created the core, and a score is provided for the patch. In kernel core analysis, scoring also utilizes the information derived from the kernel core file (such as the panic string, panic functions, panic modules, and panic type) to provide a more accurate scoring for each patch based on panic or fault information in the kernel core file, which enables better ranking and/or recommendations to be produced by the core analysis tool 150.

Scoring by the core analysis tool 150 may also involve finding patches that address certain bugs (as indicated in field 236 in the patch record 230) that may have caused the unexpected interrupt (which initiated the creation of the core file being analyzed). In other words, the core analysis tool 150 is useful for addressing the particular bug(s) that is affecting operation of the client computer system 110. In this regard, the identified bug files 175 that comprise records of information for bugs that have previously been identified in the client computer system 110 (or in other client computer systems, not shown, as the analyst node 130 is readily useful for monitoring and analyzing more than one computer system). One embodiment of a database-type record 210 shown in FIG. 2 for two exemplary identified bugs.

As shown, each database entry includes a bug ID field 212 containing an identification code for the bug, a bug symptoms field 214 for providing information on what type of interrupt may be caused by the bug (e.g., a panic type), and a bug synopsis field 216 for inclusion of descriptive information on when and why the bug occurs and other data. In case the information for bug symptoms field 214 is not available, the core analysis tool 150 functions to derive these symptoms from the information in the bug description field 218. The scoring process may be designed such that the core analysis tool 150 utilizes one or more of these fields 212, 214, 216, and 218 to determine which bugs are present in the computer system 110 as evidenced by analysis of the core files 164, 166 and which of these bugs addressed by the patches in the limited patch search set by performing comparisons of the information in the patch records 220, 230 and the bug records 210. A "bug" score is then added to the patch score to provide a more detailed and accurate score for each patch in the patch search set for use in creating the detailed patch search report.

The scoring process performed by the core analysis tool 150 is based on a detailed methodology, which is stored in the patch scoring rules 162 or elsewhere for access by the core analysis tool 150. The core analysis tool 150 is configured to automatically retrieve and use these patch scoring rules 162 from memory 160 to score each patch in the patch search set. While these patch scoring rules (discussed in detail with reference to FIG. 3) are typically defined prior to operation of the analysis system 100, one embodiment of the invention involves the operator of the analyst node 130 changing at least some of the scoring rules 162 via the user interface 144 as a step of core file analysis. In this manner, the core analysis tool 150 can be adapted by an operator to suit the selection criteria of a particular client computer system 110 (e.g., to suit the demands of the system 110 operator) and/or to suit an analyst's background and experience (e.g., higher experienced analysts may desire to customize the core analysis process while lower experience analysts may wish to rely on default behavior).

Figure 3:
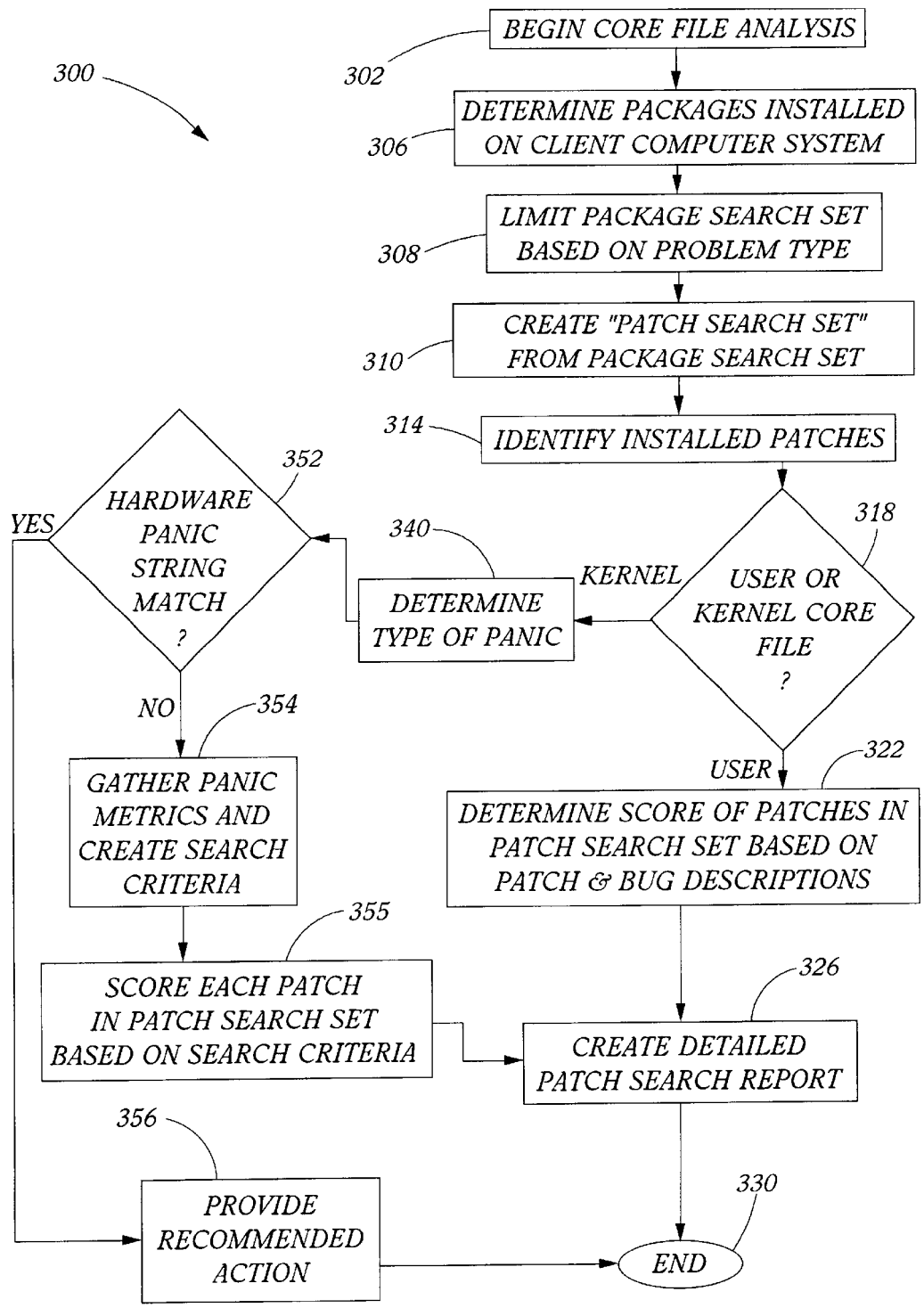
FIG. 3 is a flow diagram showing a core analysis carried out by the patch selection system of FIG. 1 including searching for and ranking patches useful to fix software bugs in the client computer system of FIG. 1.

The operation of the automated core analysis system 100 will now be discussed in detail with reference to FIGS. 1–3. Referring first to FIG. 3, exemplary steps of a core analysis process 300 according to the invention and, at least partially performed by the core analysis tool 150, are illustrated. The core file analysis 300 begins at 302 typically with a request from the client computer system 110 (unless monitoring is automated or independently performed by the analyst node 130) for support in identifying a patch to overcome an unexpected interrupt (e.g., determine why a computer system crashed and how to avoid the problem in the future). Along with the request, the kernel core file and/or the user core file for analysis are typically provided or the location in memory is provided. The core analysis tool 150 acts to store the received or referenced core file in the kernel core files 164 or user core files 166 as appropriate (alternatively, the core analysis tool 150 may inspect the core file at its current memory location rather than transferring it to another memory location).

At 306, the core analysis tool 150 acts to determine which software packages 117 are installed on the requesting client computer system 110. In the online mode of operation, the core analysis tool 150 communicates with the client computer system 110 via links 118, 124 and network 120 to directly retrieve this information. In the offline mode of operation, this information would be retrieved by the core analysis tool 150 from an Explorer file 168 provided with the request from the client computer system 110. The number of packages used in later steps of the analysis 300 may be further limited at 308 to make the analysis 300 more efficient (e.g., reduce the number of patches that have to be scored and the like).

The techniques used for paring down the installed packages set to a smaller, more useful installed package set may differ for user core files 166 and kernel core files 168. For example, instead of using all the installed packages for kernel core analysis, it may be useful to only use installed packages that include kernel drivers or one or more other program routines. To narrow the package set in user core file analysis, the core analysis tool 150 may be configured to only include, for example but not as a limitation, installed packages containing a specified binary along with packages that are determined to be interdependent or related to the packages with the specified binary. This package limiting is achieved at 308 and can be thought of as limiting the packages to a package search set which includes packages relevant to the problem type.

At 310, the analysis process 300 continues with the creation of a patch search set comprising patches relevant to the installed packages or, more preferably, the smaller subset of installed packages in the package search set. In one embodiment, the patch search set is created by the core analysis tool 150 by searching the patch cross reference files 185 for patches that include information in the related packages field 224 that indicates they are useful with that package (and, in some embodiments, the particular version and architecture of the package). For example, every patch that references a particular operating system or user application package may be selected for inclusion in the patch search set. In another embodiment, a separate file is maintained for each package that lists each patch utilized with the packages, and the core analysis tool 150 accesses this separate file to create the patch search set. As will be understood, steps 306, 308, and 310 work in combination to enhance the efficiency and accuracy of the analysis process 300 by significantly reducing and narrowing the number of patches that are processed in later steps of the analysis 300 and included in the resulting patch search report.

Next, at 314, the core analysis tool 150 operates to identify the installed patches 116 on the client computer system 110. This information is useful in creating recommended actions by comparing installed patches 116 with patches in the patch search list (especially those patches with a higher ranking or score) to identify whether patches have already been installed and whether the most recent version of recommended patches are installed. The installed patches 116 are determined in the online mode by contacting the client computer system 110 and in the offline mode by analyzing the Explorer file 168 or other information for the client computer system 110.

At 318, the core analysis 300 begins to differ depending on whether the core file was created from a kernel program or a user application (including a user binary). If the underlying or interrupted program was a user application, the analysis 300 continues at 322 with the determination of the score of the patches in the patch search set from step 310. In general, the scoring process or rules 162 for a user core file 166 involves processing each patch in the patch search set to compare the patch description (from field 234) and the description of the bugs fixed or addressed by the patch (from field 236) with descriptions of the underlying program. For example, in one embodiment, one hundred points are assigned to a patch for each description line in the program (or in the information printed out relating to the program) that matches the text in the patch description field 234 and one point is assigned for each referenced bug 236 that includes a description (bug synopsis 216 and bug description 218) that matches a description in the program (or a string from the core file). If a user binary is being analyzed rather than a user core, the score would be given for a match of the binary name with the description of the patch. In this manner, each patch score assigned includes the sum of all scores for patch description and bug description matches. In this embodiment, emphasis or higher scoring is provided to patches whose description better matches the program that created the core file but the emphasis may be altered by an operator to obtain other useful results.

At 326, the core analysis 300 of a user binary or user core file continues with the creation of a detailed patch search report that provides the scoring of each patch. In essence, the score is selected to rapidly provide a ranking of the most relevant or useful of the patches in the patch search set. Typically, the most useful patches will have the highest numbers assigned to them. The detailed report preferably also includes recommendations and other information useful to the analyst. The report is provided to the analyst node 130 for printing, storage, and/or viewing with the user interface 144. The recommendations may include instructions to install or update (e.g., when the installed patch is an earlier version) higher ranked patches or to install or update all patches having a non-zero score. In a preferred embodiment, creation of the detailed report includes comparing at least the higher ranked patches with the listing of installed patches to determine if newer versions of the installed patches are available, and this information is provided in the report. The additional information typically will include the scoring methodology utilized in the analysis 300 and may optionally include the patch search set, the comparison strings or program description used in the analysis 300, the installed patches relating to the installed packages, and other information (such as indicating whether analysis was performed in online or offline mode). At 330, the analysis 300 is ended, and at this point, the identified bug files 170 and the patch files 180 may be updated to include the information learned in the analysis 300.

The scoring process for kernel core files 164 is more complex than for user core files 166 with the added use of panic or fault metrics and/or other metrics. In one preferred embodiment that is particularly useful with, but not limited to, UNIX™-based client computer systems 110, four factors or metrics are considered, including: the panic type, the panic string, pre-panic functions, and the pre-panic modules. These or other factors typically would be included and detailed in the patch scoring rules 162 in memory 160 for access by the core analysis tool 150. In this embodiment, the analysis of a kernel core file continues at 340 with the determination by the core analysis tool 150 of which type of panic or unexpected interrupt resulted in the kernel core file being created by analysis of the kernel core file. These types of panic include a trap panic (e.g., a data fault), a suspected hang (e.g., panic "zero" or use of L1-A), a sync time-out panic, a direct call to panic, and a H/W panic. Note, the types of panic utilized may be specific to certain operating systems (with the above listed panics being useful for a Solaris™ system) with modification to other operating systems being within the scope of this invention and apparent to those skilled in the computer arts.

At 352, if the panic is a hardware type panic and a panic string is matched in the hardware error files 190, a recommended course of action is provided at 356, e.g., replace the indicated board, and the analysis is ended at 330. In a preferred embodiment, the process 300 is interrupted upon such an occurrence because ranking patches would be unhelpful. If no such match occurs, the core analysis tool 150 continues at 354 with a known type of panic to automatically process the kernel core file to gather the other three metrics.

These metrics include the panic string, a number of functions performed immediately prior to the panic, and a number of modules performed prior to the panic. The number of function and modules collected may be varied (e.g., 1 to 10 or more), and in one embodiment, the number of functions and modules collected is four to obtain useful scoring. Combining these four metrics creates the scoring criteria or search criteria that are compared with information in the patch and bug records of each patch in the patch search set. Other scoring techniques will be apparent from this disclosure and are considered within the breadth of this invention. For example, select ones and combinations of these four metrics and additional metrics may be used to provide a useful kernel core file scoring and ranking.

Scoring of each patch occurs at 355. As with the scoring of patches for use with user applications, different point amounts are assigned to each of the four metrics to stress what is deemed a more important match (e.g., a metric more likely to indicate a useful or relevant patch to install in the client computer system 110). For example, in one embodiment of the invention, each patch is scored as follows: 1,000,000 points for a match with the panic string derived from the core file; 10,000 points for a match with any of the four prior panic functions (e.g., from panic function information derived from the core file by the core tool); 100 points for a match with any of the four prior panic modules (e.g., panic module information from the core file), and 1 point for each referenced bug's description (e.g., information from the bug symptoms found in or derived from the core file) that matches the panic type, which provides a cumulative score of the bugs fixed or addressed by the patch. Clearly, with this scoring scheme, patches for which a match is obtained with the panic string will be highly ranked and will be recommended for installation (or upgrading, if down-rev).

Significantly, the scoring by use of differing powers of one hundred provides a quick indication of which metrics obtained matches. With this in mind, higher scoring patches may be ranked highest but in some embodiments patches for which a different or lower power of ten indicates a larger number of matches may be higher ranked or at least recommended for installation or updating. Further, it should be noted that the score may not be proportional to the likelihood of the patch fixing the cause of the unexpected interrupt, but generally, a higher score indicates a higher likelihood of a patch being useful for addressing at least a portion of the problem.

In a preferred embodiment, the core analysis tool 150 is configured to adapt or modify the scoring of patches at 355 to account for the type of panic involved. For example, when a trap panic is identified, panic string matches are ignored or not scored as a match. Similarly, when a hang panic is identified, function and module matches are not scored. Those skilled in the art will readily understand additional panic type and panic metric matches that are preferably not scored because such scoring would provide a less accurate scoring of a patch. By using this "smart" or adaptive scoring process of the core analysis tool 150, each patch is scored more accurately to avoid many of the errors that are made by analysts performing manual searches of patches.

At 326, the core analysis tool 150 operates to generate a detailed patch search report. The patch search report may contain varying amounts of detail (which may be selectable by the operator via the user interface 144 by selecting a report style). Typically, the report would at least include a listing of all located patches that have a score greater than zero along with an assigned score. Preferably, the patches would be listed in order of rank, such as highest score first. Additionally, the report typically includes a recommendation created automatically by the core analysis tool 150, and the recommendation may include an indication of which patches are most likely to resolve the problem and should be installed.

To determine if updating of recommended patches may be useful, the patch search set is compared with the installed patches to determine if the latest revision is installed in the client computer system 110. If not, this information is provided in the patch search report. Of course, a very detailed report may also be provided listing all of the information gathered and used during the analysis 300 (e.g., installed patches, patch search set, scoring criteria or rules used, and the like). The analysis 300 is ended at 330 at which point the identified bug files 175, patch files 180, patch cross reference files 185, and hardware error files 190 may be updated if necessary and the operator of the analyst node 130 can view, print, store or otherwise use the patch search report.

In one embodiment of the analysis system 100, the core analysis tool 150 creates a recommended patch installation list based on the scoring process. The core analysis tool 150 is configured in this embodiment to automatically retrieve the recommended patches from memory 160 and to deliver these patches to the client computer system 110 for installation. The installation may be manual or may also be automated based on initiation by the analyst node 130 and its access and control over operation of the client computer system 110.

If the kernel core file includes more than one occurrence of panic, each panic type is determined at 340 and steps 352, 354, 355, and 326 are performed for each panic occurrence to provide a patch search report for each panic. In this manner, the core analysis 300 is useful for identifying multiple problems in the client computer system 110 and providing recommended corrective actions (e.g., installation of all patches relevant to the particular problems).

According to another feature of the invention, the core analysis tool 150 can be configured to process all the scores for the patches in the patch search set to determine when the cause of the unexpected interrupt is a new or at least unidentified bug. For example, if there are no patches with a bug description match or only a relatively small number of matches, the core analysis tool 150 may provide this information as a separate line item of patch search report. This information may be used by the operator of the analyst node in determining whether a new bug should be identified and added to the bug files 175. For example, if identified and recommended patches are installed in the system 110 and resolve the problem, a bug may be described and placed in the bug files 175. In this scenario, it would also be useful to update the installed patches to provide a reference in field 236 to the newly indexed bug.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, examples are provided for previously identified bugs and patches and these can be varied considerably in practicing the unique scoring and ranking features of the invention. Similarly, the descriptive information and/or strings collected from the underlying programs and core files may also be varied and preferably are adapted to provide more accurate and consistent matching and, hence, the scoring process and results. Hence, the scoring process with its rules and search and scoring criteria may need to be adapted to the client computer system 110 being serviced or analyzed. Additionally, the particular scoring techniques discussed above may be altered and modified and are only intended for providing one useful embodiment of the invention.

In practice, because information entered in text fields in the files 175, 180, 185, 190 for bug descriptions and patch descriptions are often free form and of marginal use for automated and/or intelligent searching, the core analysis tool 150 may be configured to use keyword searches to roughly categorize bugs and patches for more effective matching. For example, if a bug description indicates the system "deadlocked" or "hanged", the core analysis tool 150 may be configured to match these phrases with the core dump. Of course, the core analysis tool 150 and system 100 will operate more efficiently with logical and planned indexing of files and information that increase the speed and accuracy of matching bugs and patches.

Further, the number of factors and related metrics used to score patches in kernel core file analysis may readily be altered while still obtaining the automated searching and ranking features of the invention. The above description stressed the use of panic metrics for use in scoring kernel core files, which is particularly useful with UNIX™ and UNIX™-based operating systems. The invention is of course useful with other operating systems, and in this regard, it is understood that other fault or error information or messages may be utilized to provide scoring of kernel core files. In this regard, an initial step in the analysis process 300 may be to select or identify the operating system utilized in the client computer system 110. Alternatively, unique analyst nodes and database servers with dedicated files 175, 180, 185, and 190 may be utilized for each type of operating system as each typically has differing bugs and patches.

I claim:

1. A method for analyzing a core file created by a computer system, the core file comprising a memory image including information on software executing on the computer system at the time of an unexpected, operating interrupt and including fault information corresponding to the interrupt, the method comprising:

determining packages installed on the computer system;

accessing patch files comprising descriptive data for patches useful for correcting bugs in the computer system; and processing the patch files to create a patch search set comprising the patches in the patch files which are configured for use with the installed packages;

assigning a score to each of the patches in the patch search set based on a set of scoring rules;

creating a patch search report including the patch scores;

wherein the core file is a kernel core file related to a kernel on the computer system and the score assigning includes identifying a type of fault, gathering fault metrics, and creating a scoring criteria based on the identified type of fault and the gathered fault metrics; and wherein the type of fault is selected from the set of panic types and the fault metrics are selected from the group consisting of panic strings, pre-panic functions, and pre-panic modules.

2. The method of claim 1, wherein the core file comprises a user core file related to a user application and the score assigning includes identifying matches between the descriptive data for the patches with program descriptive information in the core file.

3. The method of claim 2, wherein the core file includes fault information, and wherein the score assigning further includes identifying matches between descriptions of bugs referenced in the patch files of the patches in the patch search set and the fault information.

4. The method of claim 1, wherein the gathered fault metrics from the core file include the panic string, four pre-panic functions, and four pre-panic modules, and wherein score assigning includes assigning for matches between the descriptive data for the patches in the patch search set and the panic string a first number of points, for matches between the descriptive data for the patches in the patch search set and the four pre-panic functions a second number of points, and for matches between the descriptive data for the patches in the patch search set and the four pre-panic modules a third number of points.

5. The method of claim 4, wherein the scoring further includes assigning a fourth number of points for matches between descriptions of bugs referenced in the patches in the patch search set and fault information in the core file, and wherein the first, second, third, and fourth numbers are differing powers often increasing in size from the fourth number to the first number.

6. The method of claim 1, wherein the score assigning is automatically adaptive to the identified type of fault and comprises selectively assigning a number of points for a match between the gathered fault metrics from the core file and the descriptive data for the patches in the patch search set based on the type of fault.

7. The method of claim 1, wherein the patch search report creating includes first determining which of the patches in the patch search set are installed on the computer system, second determining whether updated versions of the installed patches are available, and using information from the second determining to provide patch update recommendations in the patch search report.

8. A method for analyzing a core file created by a computer system, the core file comprising a memory image including information on software executing on the computer system at the time of an unexpected, operating interrupt and including fault information corresponding to the interrupt, the method comprising:

determining packages installed on the computer system;

accessing patch files comprising descriptive data for patches useful for correcting bugs in the computer system:

processing the patch files to create a patch search set comprising the patches in the patch files which are configured for use with the installed packages;

assigning a score to each of the patches in the patch search set based on a set of scoring rules; and creating a patch search report including the patch scores;

wherein the core file is a user core file related to a user application and includes fault information;

wherein the score assigning includes identifying matches between the descriptive data for the patches with program descriptive information in the core file and further includes identifying matches between descriptions of bugs referenced in the patch files of the patches in the patch search set and the fault information; and wherein a first amount of points are assigned for the identified patch description matches and a second number of points are assigned for the identified bug description matches, and wherein the first amount of points is greater than the second amount of points.

9. A method for selecting software patches for installation in a computer system, comprising:

accessing a patch file comprising descriptive data for patches configured for installation in the computer system, the descriptive data including references to bugs relevant to the patches;

accessing a bug file comprising descriptive data for bugs relevant to operation of the computer system;

accessing a core file created by the computer system to isolate fault information and descriptions of executables running of the computer system, wherein the core file is a kernel core file;

determining the packages installed on the computer system;

identifying the patches in the patch file relevant to the installed packages for the processing;

processing the patch file to assign a score to the patches based on matches between the executables descriptions and the patch descriptive data and on matches between the fault information and the bug descriptive data for the bugs referenced by the patches, wherein the processing comprises processing the core file to determine a type of panic and to gather panic-related metrics for use in the assigning of the score to the patches; and recommending the patches based on the assigned scores.

10. The method of claim 9, further including prior to the patch file processing, determining which of the identified patches reference the running executables and only including the determined patches in the processing.

11. A computer program product for analyzing a core file generated by a computer system, comprising:

first computer code devices configured to cause a computer to determine software packages installed on the computer system;

second computer code devices configured to cause a computer to access patch files comprising descriptive data for patches useful with the computer system to create a patch search set comprising select ones of the patches configured for use with the installed packages;

third computer code devices configured to cause a computer to assign a patch score to each of the patches in the patch search set based on predefined scoring rules; and fourth computer code devices configured to cause a computer to create a patch search report including recommended corrective actions based on the patch scores;

wherein the core file is a kernel core file and the third computer code devices are further configured to assign the patch scores by gathering a set of fault metrics and comparing the gathered fault metrics with the descriptive data for each of the patches in the patch search set to identify matches; and wherein differing amounts of points are assigned by the third computer code devices for each of the fault metrics to prioritize select ones of the fault metrics.

12. The computer program product of claim 11, wherein the fault metrics are selected from the group consisting of panic strings, pre-panic functions, and pre-panic modules and wherein the gathering includes determining a panic type, the patch score assigning being adapted by the third computer code devices based on the panic type.

13. A patch selection system for at least partially automatically processing a core file to select patches to address bugs in a computer system, comprising:

a memory device for storing patch files comprising descriptive information for patches adapted for addressing bugs on the computer system; and a core analysis tool linked to the memory device to access the patch files, wherein the core analysis tool is configured to process the core file to identify fault information and executing program information and to compare the fault information and executing program information with the descriptive data of the patch files to assign a score to the patches;

wherein the core analysis tool is adapted to process the core file to gather fault metric information and wherein the assigning of the scores involves adding points to a patch score for identified matches between the gathered fault metric information and the descriptive data for the patches in the patch file.

14. The system of claim 13, wherein core analysis tool is further configured to create a patch search report including recommendations for the patches based at least partially on assigned scores.

15. The system of claim 13, wherein the core analysis tool is operable to determine packages installed on the computer system and to create a patch search set for use in assigning scores comprising the patches in the patch files adapted for use with the installed packages.

16. The system of claim 15, wherein the core analysis tool is communicatively linked to the computer system to determine the installed packages and to determine installed patches, and wherein version information for the installed patches is compared with version information for the patches in the patch search set to identify down revision ones of the installed patches.

17. The system of claim 13, wherein the core analysis tool functions to compare bug reference information for the patches in the patch file with the fault information of the core file and to add a number of points to the score of the patches for each match in the comparison.

18. A method for analyzing a core file created by a computer system, the core file comprising a memory image including information on software executing on the computer system at the time of an unexpected, operating interrupt and including fault information corresponding to the interrupt, the method comprising:

determining packages installed on the computer system;

accessing patch files comprising descriptive data for patches useful for correcting bugs in the computer system;

processing the patch files to create a patch search set comprising the patches in the patch files which are configured for use with the installed packages;

assigning a score to each of the patches in the patch search set based on a set of scoring rules; and creating a patch search report including the patch scores;

wherein the core file is a kernel core file related to a kernel on the computer system and the score assigning includes identifying a type of fault, gathering fault metrics, and creating a scoring criteria based on the identified type of fault and the gathered fault metrics; and wherein the score assigning is automatically adaptive to the identified type of fault and comprises selectively assigning a number of points for a match between the gathered fault metrics from the core file and the descriptive data for the patches in the patch search set based on the type of fault.

19. The method of claim 18, wherein the core file is a user core file related to a user application and the score assigning includes identifying matches between the descriptive data for the patches with program descriptive information in the core file.

20. The method of claim 19, wherein the core file includes fault information, and wherein the score assigning further includes identifying matches between descriptions of bugs referenced in the patch files of the patches in the patch search set and the fault information.

21. The method of claim 20, wherein a first amount of points are assigned for the identified patch description matches and a second number of points are assigned for the identified bug description matches, and wherein the first amount of points is greater than the second amount of points.

22. A patch selection system for at least partially automatically processing a core file to select patches to address bugs in a computer system, comprising:

a memory device for storing patch files comprising descriptive information for patches adapted for addressing bugs on the computer system; and a core analysis tool linked to the memory device to access the patch files, wherein the core analysis tool is configured to process the core file to identify fault information and executing program information and to compare the fault information and executing program information with the descriptive data of the patch files to assign a score to the patches;

wherein the core analysis tool functions to compare bug reference information for the patches in the patch file with the fault information of the core file and to add a number of points to the score of the patches for each match in the comparison.

23. The system of claim 22, wherein core analysis tool is further configured to create a patch search report including recommendations for the patches based at least partially on assigned scores.

24. The system of claim 22, wherein the core analysis tool is operable to determine packages installed on the computer system and to create a patch search set for use in assigning scores comprising the patches in the patch files adapted for use with the installed packages.

25. The system of claim 24, wherein the core analysis tool is communicatively linked to the computer system to determine the installed packages and to determine installed patches, and wherein version information for the installed patches is compared with version information for the patches in the patch search set to identify down revision ones of the installed patches.

* * * * *

UNITED STATES PATENT AND TRADEMARK OFFICE
CERTIFICATE OF CORRECTION

PATENT NO. : 6,763,517 B2
DATED : July 13, 2004
INVENTOR(S) : George W. Hines

It is certified that error appears in the above-identified patent and that said Letters Patent is hereby corrected as shown below:

Column 15,
Line 17, "often" should be -- of ten --

Signed and Sealed this

Fourteenth Day of September, 2004

JON W. DUDAS
*Director of the United States Patent and Trademark Office*